US011192822B2

United States Patent
Abdul Wadi et al.

(10) Patent No.: US 11,192,822 B2
(45) Date of Patent: Dec. 7, 2021

(54) ENHANCED NICKEL PLATING PROCESS

(71) Applicant: Western Digital Technologies, Inc., San Jose, CA (US)

(72) Inventors: Mohd Aizat Abdul Wadi, Johor Bahru (MY); Shian Ming Liew, Kuching (MY); Shan Lih Lim, Kuching (MY)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/676,344

(22) Filed: Nov. 6, 2019

(65) Prior Publication Data
US 2020/0148589 A1 May 14, 2020

Related U.S. Application Data

(60) Provisional application No. 62/757,658, filed on Nov. 8, 2018.

(51) Int. Cl.
| | | |
|---|---|---|
| *C03C 17/36* | (2006.01) | |
| *C03C 17/38* | (2006.01) | |
| (Continued) | | |

(52) U.S. Cl.
CPC ...... *C03C 17/3649* (2013.01); *C03C 17/3697* (2013.01); *C23C 18/1651* (2013.01);
(Continued)

(58) Field of Classification Search
CPC ............ C03C 17/3649; C03C 17/3642; C03C 17/3697; C03C 17/3607; C03C 17/36;
(Continued)

(56) References Cited

U.S. PATENT DOCUMENTS 4,150,177 A * 4/1979 Guditz ................... H01L 24/82
430/324
5,474,798 A * 12/1995 Larson .................. H05K 3/062
205/125
(Continued)

FOREIGN PATENT DOCUMENTS

| CN | 1740388 A | 3/2006 |
|---|---|---|
| CN | 102320744 A | 1/2012 |
(Continued)

OTHER PUBLICATIONS

Matsuo et al.; "Glass Substrate Magnetic Recording Media"; Fuji Electric Review; vol. 51 No. 1; p. 10-14; Accessed on Oct. 24, 2019 <https://www.fujielectric.com/company/tech/pdf/r51-1/02.pdf>.
(Continued)

*Primary Examiner* — Katherine A Bareford
(74) *Attorney, Agent, or Firm* — Loza & Loza, LLP; Gabriel Fitch (57) ABSTRACT

A method for plating nickel onto a glass surface of a substrate by sequentially contacting the surface with a solution having an oxidizing agent, a solution containing a silane compound, a Pd/Sn solution, and a nickel ion-containing solution, thereby accomplishing an electroless nickel plating process.

17 Claims, 3 Drawing Sheets

(51) Int. Cl.
*C23C 18/18* (2006.01)
*C23C 18/32* (2006.01)
*C23C 18/36* (2006.01)
*G11B 5/73* (2006.01)
*C23C 18/16* (2006.01)

(52) U.S. Cl.
CPC ...... *C23C 18/1855* (2013.01); *C23C 18/1893* (2013.01); *C23C 18/32* (2013.01); *C23C 18/36* (2013.01); *G11B 5/73921* (2019.05); *C03C 2217/254* (2013.01); *C03C 2217/261* (2013.01); *C03C 2218/11* (2013.01); *C03C 2218/31* (2013.01)

(58) Field of Classification Search
CPC ........ C03C 2217/254; C03C 2217/261; C03C 2218/11; C03C 2218/31; G11B 5/73921; G11B 5/8404; C23C 18/1651; C23C 18/32; C23C 18/34; C23C 18/1855; C23C 18/1893; C23C 18/36; C23C 18/50
See application file for complete search history.

(56) References Cited

U.S. PATENT DOCUMENTS

| | | | |
|---|---|---|---|
| 6,833,175 B2 | 12/2004 | Yoshida et al. | |
| 7,259,936 B2 | 8/2007 | Yamamoto et al. | |
| 7,514,118 B2 | 4/2009 | Iso et al. | |
| 8,206,789 B2 | 6/2012 | Suzuki | |
| 8,241,516 B2 | 8/2012 | Fujii et al. | |
| 8,834,962 B2 | 9/2014 | Suzuki et al. | |
| 2002/0168423 A1* | 11/2002 | Wurzburger | A61K 33/34 424/709 |
| 2002/0192379 A1 | 12/2002 | Imori | |
| 2003/0235714 A1 | 12/2003 | Koda et al. | |
| 2004/0152306 A1* | 8/2004 | Okada | H01L 21/76877 438/687 |
| 2004/0241379 A1* | 12/2004 | Horie | C03C 19/00 428/848.2 |
| 2004/0265641 A1 | 12/2004 | Ishii et al. | |
| 2005/0031788 A1* | 2/2005 | McCaskie | C04B 41/5144 427/305 |
| 2005/0287304 A1* | 12/2005 | Iso | C23C 18/1893 427/430.1 |
| 2006/0024431 A1 | 2/2006 | Tei et al. | |
| 2006/0210837 A1 | 9/2006 | Kurihara et al. | |
| 2010/0059820 A1* | 3/2010 | Ohmi | H01L 29/78639 257/347 |
| 2013/0260027 A1* | 10/2013 | Illzumi | B24B 37/08 427/128 |

FOREIGN PATENT DOCUMENTS

| | | |
|---|---|---|
| JP | H03180476 A | 8/1991 |
| JP | 2000163743 A | 6/2000 |
| JP | 2006291270 | 10/2006 |
| JP | 2006338837 A | 12/2006 |

OTHER PUBLICATIONS

Chin-Wei, Hsu et al., "Manipulating the adhesion of electroless nichel-phosphorus film on silicon wafers by silane compound modification and rapid thermal annealing", published Aug. 29, 2017, 11 pages.

International Search Report and Written Opinion for International Application No. PCT/US19/60246, dated Mar. 26, 2020, 9 pages.

* cited by examiner

ENHANCED NICKEL PLATING PROCESS

CROSS-REFERENCE TO RELATED APPLICATIONS

This application claims the benefit of priority under 35 U.S.C. § 119(e) from U.S. Patent Application No. 62/757,658, filed Nov. 8, 2018, the disclosure of which is incorporated herein by reference in its entirety.

FIELD

The present invention relates generally to the electroless nickel plating of glass substrates, in particular substrates used in magnetic recording media such as hard disk drives.
Introduction Electroless nickel plating ("ENP") is a process for depositing a layer of nickel or a nickel alloy on the surface of a solid substrate. The process typically involves immersing the substrate in a bath of plating solution containing nickel ions. A reducing agent such as hydrated sodium hypophosphite ($NaPO_2H_2 \cdot H_2O$) reacts with the surface material of the substrate to deposit the nickel or nickel alloy.

Aluminum is commonly used as a substrate for forming hard disk drive (HDD) platters, and during fabrication such aluminum substrates may be plated with nickel using electroless nickel plating. However, conventional aluminum substrates have poor stiffness and flatness below a thickness of 0.6 mm, and HDD platters of such reduced dimensions may suffer from flutter (vibration during rotation) when fabricated from aluminum. To produce platters of reduced thickness with low flutter, HDD platters can be fabricated using glass substrates.

Forming a nickel layer on a glass substrate with ENP, for example to produce a disk for a hard disk drive, requires different steps than when an aluminum substrate is used. One alternative of such a process was disclosed in Japanese Patent Publication No. 2000-163743, involving the application of a solution of $PdCl_2$ to a silanized glass surface followed by a heat treatment at 200° C. to 350° C. to anneal the nickel layer to the glass surface. US Patent Publication 20060210837 teaches a similar ENP process involving the formation of a palladium layer on a silanized surface using $PdCl_2$ followed by a high temperature annealing step.

SUMMARY

Electroless nickel plating can be used in the manufacture of magnetic layers on disks for hard disk drives. In the present method for plating a layer of nickel or nickel alloy, a substrate having a glass surface is provided, for example a substrate formed from a glass material. The glass material can be amorphous or partially crystallized, and can be a silicate glass, a soda lime glass, an alkali-free glass, an aluminosilicate glass, a borosilicate glass, or an aluminoborosilicate glass. The glass surface is then subjected to mechanical roughening in order to create a roughened surface, for example by applying an abrasive material to the surface such as a slurry of microparticles having diameters of between 4 μm and 10 μm. The substrate surface can optionally also be contacted with a corrosive chemical, and can then be washed to remove contaminants from the glass surface of the substrate.

Following roughening, the glass surface can be placed in contact with an oxidizing agent to provide an oxidized surface having covalently bonded hydroxyl groups. The oxidizing agent can be a solution of $H_2SO_4$, $H_2O_2$, $HNO_3$, HF, chromic acid, $KMnO_4$, or combinations of these. The oxidized surface is then contacted with a solution comprising a silane compound having one or more silanol groups such as aminosilane, 3-(2-aminoethylamino)propyltrimethoxysilane (EDAS), 3-2-(2-aminoethylamino)ethylamino propyl trimethoxysilane (ETAS), and/or (3-aminopropyl)triethoxysilane (APTES). The silane compound in the solution, which can be at a pH of between 10 and 12, reacts with the hydroxyl residues of the oxidized surface and is bonded to the glass surface by silanol bonds, thereby providing a silanized glass surface.

The silanized glass surface is then contacted with a solution comprising a mixture of palladium ions and tin ions ("Pd/Sn solution"), which can be provided as $PdCl_2$ and $SnCl_2$. The Sn concentration in the solution can be between 2.0 g/L and 8.0 g/L, and the Pd/Sn solution can be contacted with the silanized glass surface at a temperature of between 20° C. and 40° C. Palladium from the Pd/Sn solution is deposited on the silanized glass surface, thereby forming an activated surface.

The activated surface is then contacted with an accelerator solution having sodium nitrate and oxalic acid, for example a solution having between 30% and 40% sodium nitrate and between 10% and 20% oxalic acid. The substrate surface is then contacted with a nickel ion-containing solution having a pH of between 8 and 10 and a temperature of between 20° C. and 30° C. in an electroless nickel strike step.

The plating portion of the process is then completed by contacting the substrate surface with a nickel ion-containing solution having a pH of between 4 and 6 and a temperature of between 40° C. and 80° C., thereby forming a layer of nickel or nickel alloy on the glass surface. The nickel ion-containing solution can include sodium hypophosphite, for example. One or more additional materials and/or layers can then be deposited onto the plated substrate to form a magnetic recording layer. A disk having a glass surface plated with a layer of nickel or nickel alloy according to the present process can be incorporated into a hard disk drive or other magnetic recording apparatus.

DETAILED DESCRIPTION

Definitions

As used herein, the following terms and variations thereof have the meanings given below, unless a different meaning is clearly intended by the context in which such term is used.

"Amino group" refers to the chemical group $-NX_2$, where X is hydrogen, an alkyl group (straight chain, branched chain, and/or cyclic), or an aryl group, including heteroalkyl and heteroaryl groups, and the nitrogen atom is bonded to another atom or compound.

"Alkoxy group" refers to the chemical group $-OR$, where R is an alkyl group (straight chain, branched chain, and/or cyclic) or an aryl group, including heteroalkyl and heteroaryl groups, and the oxygen atom is bonded to another atom or compound.

"Glass" refers to a generally amorphous material comprising primarily silicon dioxide.

"Hydroxyl group" refers to the chemical group —OH, in which the oxygen atom is bonded to another atom or compound.

"Mean square roughness" or RMS is an average of the measured microscopic peaks and valleys of a surface, and refers to the root mean square average of the profile height deviations of a surface from the mean line. RMS can be measured by an AFM (Atomic Force Microscope), for example.

"Silane compound" refers to a silicon compound with four substituents. In the present process, the silane compounds comprise at least one or two hydroxyl or alkoxy groups bonded to the silicon, and can comprise three hydroxyl or alkoxy groups, and in addition comprise at least one amino group bonded to the silicon.

"Silanol group" refers to a hydroxyl group (—OH) or alkoxy group bound to silicon. "Silanol bond" refers to a covalent bond between the oxygen of a silanol group and another atom or compound. "Silanization" refers to the covalent bonding of silane compounds to a surface through silanol bonds.

"Slurry" refers to a semiliquid mixture comprising fine particles mixed or suspended in a liquid such as water or an aqueous solution.

The terms "above," "below," "between," and other terms of relative position or orientation as used herein refer to a relative position of one layer with respect to other layers. As such, one layer deposited or disposed above or below another layer may be directly in contact with the other layer or may have one or more intervening layers, unless described otherwise herein.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Electroless Nickel Plating Process

The present ENP process can be performed on a surface formed from a glass material, and the glass surface can be a surface of a glass substrate on which the ENP process will be performed, i.e. so that the glass surface is an integral part of a glass substrate. The glass material can be an amorphous glass, although the substrate can alternatively be fully or partially crystallized or include crystalline components. The amorphous glass can for example be a silicate glass, a soda lime glass, an alkali-free glass, an aluminosilicate glass, a borosilicate glass, or an aluminoborosilicate glass. In order to form a glass substrate of high-rigidity, the glass material can be chemically strengthened by subjecting it to low-temperature ion exchange in some embodiments. Glass materials for use as substrates for the present ENP process are commercially available, and examples of such materials are described for example in U.S. Pat. Nos. 6,134,918; 6,916,558; 7,169,487; and 7,259,936.

The surface of the glass substrate to be plated can be first roughened by chemical and/or mechanical means (step 101 of FIG. 1) in order to form a roughened surface having etched areas with a mean square roughness (RMS) of between 0.1 nm and 1 nm, for example. This results in better adhesion of the palladium catalyst on the substrate surface to act as the nucleation area for the magnetic layer (i.e., the layer of nickel or nickel alloy) on the substrate. The substrate surface can be subjected to chemical-mechanical planarization and/or polishing ("CMP") in order to roughen the surface of the substrate, for example. CMP can be accomplished in ways known to the art, such as through the application of an abrasive and/or corrosive slurry to the substrate surface, for example a slurry of diamond microparticles having diameters of between 4 µm and 10 µm, for example a size of 5, 6, 7, 8 or 9 µm. Pressure can be applied to the slurry, for example a pressure of 1.5, 1.8, 2, 2.2, or 2.5 kg, by rotating a polyurethane or other polishing pad on the substrate surface at between 40 and 50 revolutions per minute (RPM), for example at speeds of 42, 44, 45, 46, 47, or 4 RPM. Mechanical roughing can also be accomplished by sandblasting or otherwise applying an abrasive such as glass beads or colloidal silica to the disk surface. Chemical roughening can be accomplished sequentially or simultaneously with mechanical roughening steps Following roughening of the substrate surface, the surface is can then be cleaned in order to remove contaminants, in particular nonpolar (oil soluble) contaminants such as grease (step 102 of FIG. 1). In one embodiment, one or more detergents or detergent solutions are applied to the substrate surface in order to remove such contaminants. Any of a number of detergents known to the art for removing such contaminants from a glass surface can be used. For example, detergents available from Decon Laboratories, Inc. (460 Glennie Circle, King of Prussia, Pa. 19406 U.S.A.) can be used, though other acidic or alkaline cleaners can be used instead or in addition to a detergent. The detergent can be applied directly to the surface to be plated in the ENP process, such as by brush coating or spin coating, or alternatively the substrate can be immersed in the detergent.

Following the application of detergent to the substrate or substrate surface, the detergent is removed by rinsing the substrate surface with a rinsing liquid such asdeionized water, although other liquids such as ethanol or other alcohols or alcohol solutions can also be used. The rinsing liquid can be sprayed onto the substrate surface, and/or the substrate can be immersed in the rinsing liquid. Following the removal of the detergent and contaminant materials from the substrate surface, any remaining rinsing liquid is removed from the substrate surface, such as through evaporation, either at ambient temperature or by heating the surface. Air or other gases, which can be filtered to avoid introducing new contaminants, can also be applied to the surface to remove the rinsing liquid, such as with an air knife, as is known to the skilled artisan.

Following this, the cleaned substrate surface is exposed to a strong oxidizing agent in order to introduce hydroxyl groups onto the substrate surface (step 103 of FIG. 1), such as by immersion, brush coating, spin coating, or other application technique. In one embodiment, the oxidizing agent is a concentrated mixture of $H_2SO_4$ and $H_2O_2$. Other solutions can also be used, for example, a solution of $HNO_3$ (nitric acid), which can be a solution of about 50% $HNO_3$. Alternatively, HF, chromic acid, $KMnO_4$, or other acids can be used to introduce hydroxyl groups, such as an aqueous solution of hydrofluoric acid of 0.001 wt % to 1 wt %. Oxidation can be conducted at temperatures of between 50° C. and 100° C., such as at between 70° C. and 80° C., for 15 minutes, 20 minutes, 30 minutes, or longer. The result of this step is the creation of an oxidized surface on the glass substrate having covalently bonded hydroxyl groups.

Figure 1:
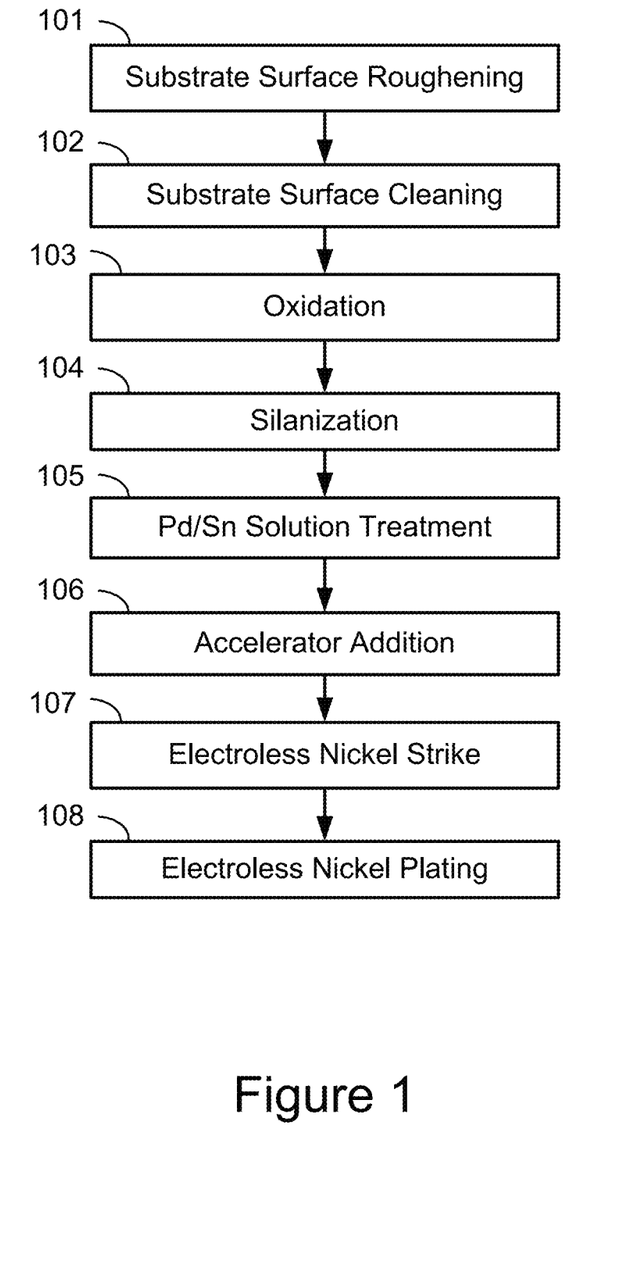
FIG. 1 is a flow chart illustrating the steps of one embodiment of the present electroless nickel plating method.

Following oxidation of the substrate surface, hydroxyl groups of the treated surface are reacted with a silane compound to form a silanol bond between the silane compound and the hydroxyl groups of the substrate surface (step

104 of FIG. 1). The silane compound is used as a coupling agent to prepare the glass surface for the deposition of a metal catalyst (palladium) in the present process. A number of silane compounds can be used in this step, including aminosilane, 3-(2-aminoethylamino)propyltrimethoxysilane (EDAS), 3-2-(2-aminoethylamino)ethylamino propyl trimethoxysilane (ETAS), and (3-aminopropyl)triethoxysilane (APTES). Silanes with alkoxysilyl groups are preferred, such as silanes with one, two or three methoxy or ethoxy groups. The silane compound can be provided in solution with water, ethanol, and/or other appropriate solvents at a concentration of between 1% and 5%, such as at a concentration of 2% or 3%. The substrate surface can be contacted with the silane-containing solution by immersion, for example, at temperatures of between 20° C. and 30° C., such as 25° C., 26° C., 27° C., or 28° C., such as at a constant temperature. The substrate surface can be contacted with the silane-containing solution for a period of between 5 minutes and 45 minutes, such as for up to 15 minutes, up to 20 minutes, or up to 30 minutes, for example at a pH of between 10 and 12, such as a pH of 11 or 11.5. The oxidized surface can alternatively be contacted with a silane compound by brush coating, spin coating, or other application technique. The result of this step is the creation of a silanized glass surface on the treated substrate.

The silanized glass surface is next rinsed with a rinsing liquid in order to remove unreacted silane compounds and other solution components. The rinsing liquid can be deionized water, an ethanol solution, or other alcohol solution. The rinsing liquid can then be removed from the surface, such as through evaporation of the use of an air knife, as discussed above.

Following rinsing and drying of the silanized substrate surface, the surface can optionally be heated. Heating can be performed at more than 50° C., for example at between 70° C. and 120° C. or at between 80° C. and 100° C., for between 5 and 30 minutes, for example for between 10 and 20 minutes. Longer time periods can be used for lower temperature treatments. Such heat treatment strengthens silanol bonding of the silane compound with the surface of the glass substrate, and allows an annealing step following ENP to be avoided.

The substrate surface is next contacted with a Pd/Sn solution, such as by immersion, although brush coating, or spin coating, though and other applications steps are also possible (step 105 of FIG. 1). The Pd/Sn solutions used in the present process include a mixture of $Sn^{2+}$ and $Pd^{2+}$, and can be acidified and present in deionized water, such as at a pH of between 1 and 5, for example at a pH of 3 or 4. The Sn component of the solution can be provided for example as $SnCl_2.2H_2O$, which can be present in concentrations of up to 0.3M, such as solutions of 0.1M, 0.12M, 0.15M, 0.17M, 0.18M, 0.20M, 0.22M, or 0.25M. For example, the Sn concentration in the solution can be between 2.0 g/L and 8.0 g/L, for example a solution of 2.1 g/L, 2.5 g/L, 3 g/L, 4 g/L, 5 g/L, 6 g/L, 7 g/L, 7.5 g/L, or 7.7 g/L. The Pd in the solution can be provided for example as $PdCl_2$, which can be present in concentrations of up to $3.5 \times 10^{-4}$ M, such as at concentrations of 3.1, 3.2, 3.3, or $3.4 \times 10^{-4}$ M. For example, Pd can be present in the solution in amounts of between 30 ppm and 120 ppm, such as at concentrations of 40 ppm, 50 ppm, 60 ppm, 70 ppm, 80 ppm, 90 ppm, 100 ppm, or 110 ppm. The Pd/Sn solution can also comprise other appropriate components, such as NaCl at concentrations of between 2M and 3M, for example at concentrations of 2.1, 2.2, 2.3, 2.4, 2.5, 2.6, 2.7, 2.8M. The substrate surface can be contacted with the Pd/Sn solution at a temperature of between 20° C. and 80° C., such as at a temperature of 25° C., 30°C., 35° C., 40° C., 45° C., 55° C., 65° C., 70° C., or 75° C.

When the silanized glass surface is immersed in the solution, $Sn^{2+}$ is believed to be deposited on the substrate surface and to act as a seeding layer for $Pd^0$. Each $Sn^{2+}$ is believed to donate 2 electrons, thereby reducing a $Pd^{2+}$ ion to Pd metal and being oxidized to $Sn^{4+}$ [Equation: $Sn^{2+}+Pd^{2+} \rightarrow Sn^{4+}Pd^0$]. Some $Sn^{4+}$ is believed to remain on the substrate surface and to stabilize and prevent the aggregation of $Pd^0$. A dispersed layer of $Pd^0$ is deposited on the substrate surface as a result of this step 105, and an activated surface is created.

Following this, the substrate surface is then rinsed, such as with deionized water, an ethanol solution, or other alcohol solution, to remove unreacted components of the Pd/Sn solution, and the rinsing liquid can then be removed from the surface, such as through evaporation or the use of an air knife.

In order to increase the adhesion strength of electroplated nickel on the substrate surface, the activated surface can be contacted with an "accelerator" solution comprising sodium nitrate and oxalic acid (step 106 of FIG. 1). This step of the process helps to rid the substrate surface of Sn4+ ions. In one embodiment, the accelerator solution comprises between 20% and 50% sodium nitrate, such as 30% or 40%, and between 10% and 20% oxalic acid, such as 12.5%, 15%, or 17.5%. The remainder of the solution can comprise deionized water. The accelerator solution can be contacted with the activated surface for between 2 and 10 minutes, such as 4 minutes, 5 minutes, 6 minutes, 7 minutes, or 8 minutes, at between 30° C. and 60° C., such as 40° C., 45° C., 50° C. or 55° C.

The Pd layer from this step 105 serves as a catalyst layer to initiate electroless nickel deposition onto the substrate surface (steps 106 and 107 of FIG. 1). After removing the accelerator solution and before initiating ENP, an electroless nickel strike (ENS) step is preferably performed (step 106 of FIG. 1). In this step, a thin layer of nickel is created on the substrate surface to act as a "seed" for the subsequent ENP step. In the ENS step, a nickel solution (ENS solution) of between 1 and 2 wt % nickel, such as a solution of 1.5 wt %, is contacted with the substrate surface, the solution having a temperature of between 20° C. and 30° C., such as a temperature of 25° C. The ENS solution can have a concentration of between 4 g/L and 6 g/L nickel and a pH of between 8 and 10, such as a pH of 8.5, 9, or 9.5, and is contacted with the substrate for only a short time, for example between 1 and 3 minutes, such as for 1½ minutes or 2 minutes ENP (step 107 of FIG. 1) is initiated by contacting the activated (Pd/Sn-treated) surface with a nickel ion-containing solution, such as a solution comprising hydrated sodium hypophosphite ($NaPO_2H_2.H_2O$). Any of a number of nickel ion-containing solutions known to the art for use in ENP can be used in this step. The nickel solution can be provided for example at alkaline pH, such as a pH of between 4 and 6, such as a pH of 4.5, 5, or 5.5, and at temperatures of between 40° C. and 80° C., such as at a temperature of 50° C., 60° C., or 70° C. When sodium hypophosphite is used, it can be provided at concentrations of between 30 g/L and 50 g/L, such as at concentrations of 35 g/L, 40 g/L, or 45 g/L, for example in concentrations of between approximately 3% and 5%, though other concentrations can be used, such as concentrations of between 2% and 10%. Nickel in the solution can be provided at concentrations of between 5 g/L and 6 g/L, such as at concentrations of 5.1, 5.2, 5.3, 5.4, 5.5, 5.6, 5.7, 5.8, or 5.9 g/L (Equation: $Ni^{2+}+H_2PO_2^-+$ $H_2O \rightarrow Ni^0 + H_2PO_3^- + 2H+$). Once a thin layer of nickel is plated on the glass surface, an auto-catalytic process continues, with hypophosphite acting as a reducing agent. Once a sufficient layer of nickel or nickel alloy is plated onto the surface of the substrate, the substrate is removed from contact with the nickel ion-containing solution, and can be rinsed to remove unreacted materials and other components of the nickel ion-containing solution, such as with deionized water.

The present process enables the use of glass substrates as platters for hard disk drives, allowing them to be thinner (<0.6 mm) and have better stiffness and rigidity than platters made from aluminum. Such rigidity enables the present process to achieve a desirably thin plated nickel layer on a glass substrate and to reduce flutter and other unwanted vibrations in rotating HDD platters. The deposited nickel layer can be in the range of between around 2 µm and 5 µm.

The present process does not require an annealing step after the electroless deposition of nickel onto a glass surface and can be performed with a heating step of above 100° C. or 150° C. following ENP. Such a step would involve heating the Ni-plated substrate to more than 150° C., such as to between 200° C. and 350° C. Although some prior art methods employ such a step in order to strengthen the bond between the nickel layer and the glass surface, heating the plated surface in this manner carries a risk of damaging the nickel layer, such as through tensile stress and/or oxidation of the nickel surface. The present process can also be employed using $HNO_3$ rather than chromic acid or $KMnO_3$, which are carcinogenic highly oxidizing.

Storage Device

Figure 2:
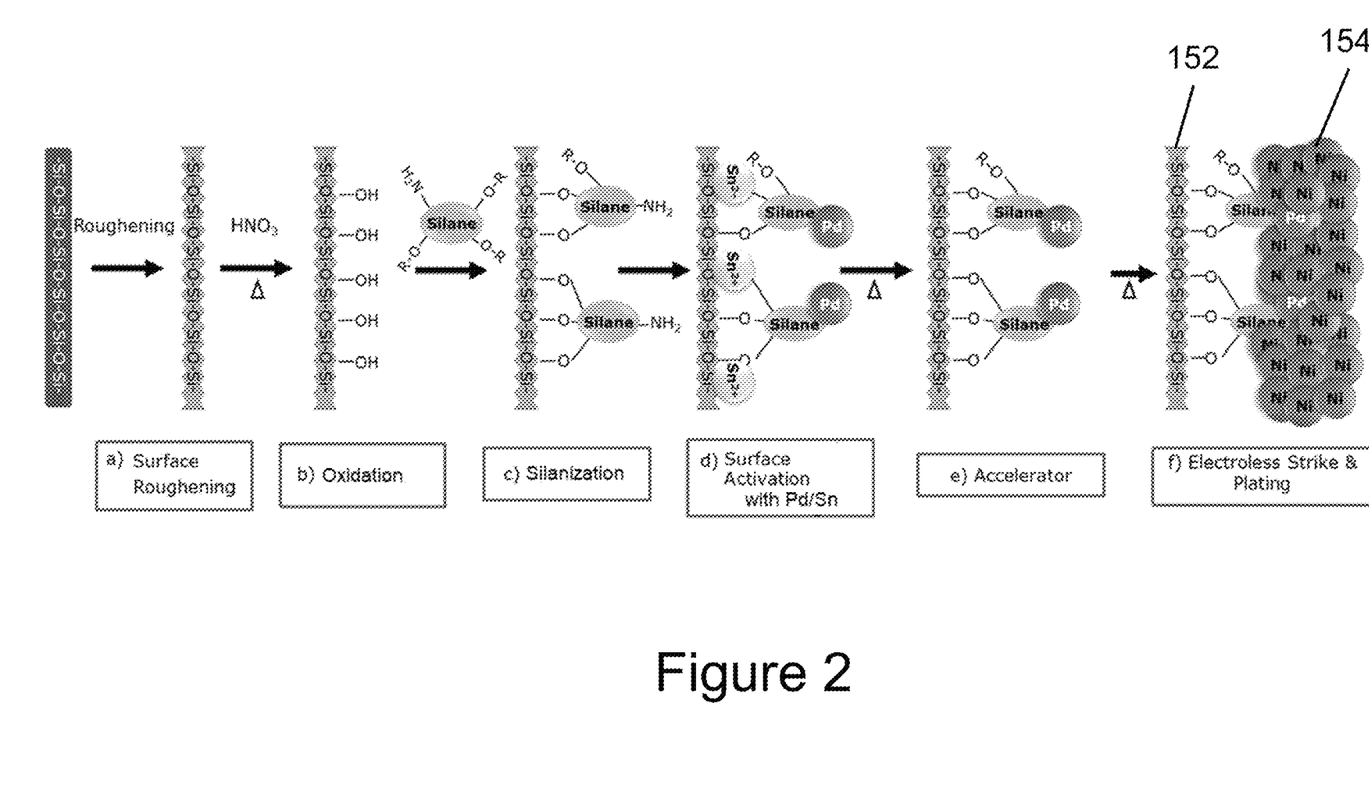
FIG. 2 is a schematic diagram of one embodiment of the present electroless nickel plating method.

The present electroless nickel plating process can be used to produce a magnetic disk for use in hard disk drives. After creating a nickel layer 154 on a substrate 152 according to the present process (as seen in FIG. 2), one or more additional materials and/or layers can be deposited onto the substrate 152, for example layers of nickel phosphorous (NiP), cobalt-platinum (CoPt), iron-platinum (FePt) alloy, and/or combinations thereof, to create a magnetic recording layer. Protective layers may also be included such as one or more layers of carbon, diamond-like crystal, carbon with hydrogen and/or nitrogen doping, and/or combinations thereof.

Figure 3:
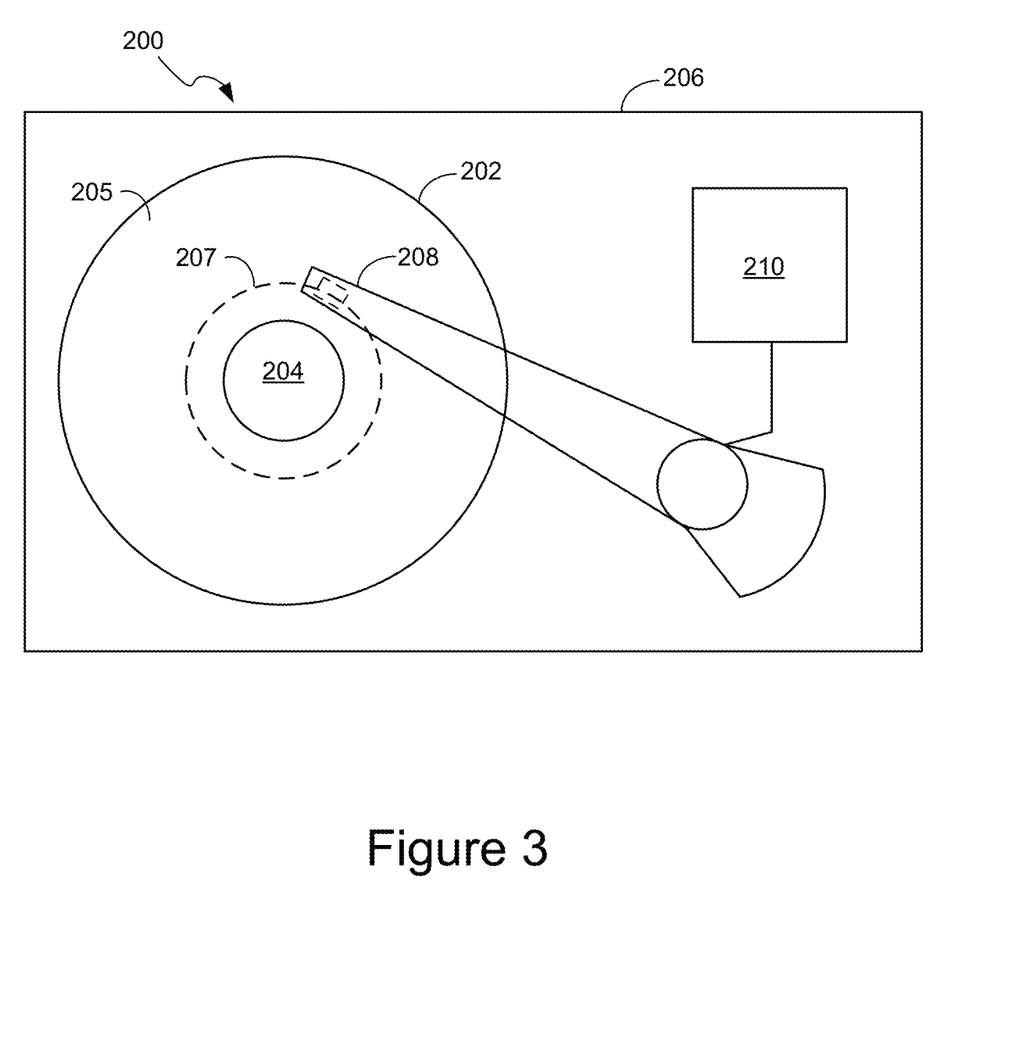
FIG. 3 illustrates a top plan view of a disk drive in accordance with an embodiment of the disclosure.

A magnetic disk produced using the present electroless nickel plating process can be used as storage media in a disk drive of a magnetic recording apparatus. FIG. 3 illustrates a plan view of a disk drive 200 (e.g., a hard disk drive for magnetic storage of information) incorporating disks (platters) 205 produced using electroless nickel plating according to the present process. The disk drive 200 includes one or more media 202 (which can be a disk), a spindle assembly 204, a drive housing 206, a slider 208 and a circuitry 210. The slider 208 may include a slider head and may be used to position the slider head. The one or more media 202 may be configured to store data, and may be a magnetic recording medium such as a media disk having a magnetic layer produced using the present electroless nickel plating process. The media 202 is positioned on the spindle assembly 204 that is mounted to the drive housing 206. Data may be stored along tracks in the magnetic recording layer of the media 202. The reading and writing of data are accomplished with a read element and a write element located with the slider 208. The write element is used to alter the properties of the magnetic recording layer of the media 202 and thereby write information thereto. In one implementation, the slider 208 may include an inductive read/write head or a Hall effect head.

During operation of the disk drive 200, a spindle motor (not shown) rotates the spindle assembly 204, and thereby rotates the media 202. The slider 208 may be positioned over the media 202 at a particular location along a desired disk track 207. The positions of the slider 208, relative to the media 202 may be controlled by a position control circuitry 210. As the media 202 is rotating, the slider 208 may glide over the media 202.

EXAMPLES

Example 1: ENP Process

In one embodiment, the ENP process described herein was performed under the conditions shown in Table 1 below.

TABLE 1

| Process Step | Process Parameter | Amount |
| --- | --- | --- |
| Oxidation ($HNO_3$) | Temperature (Celsius) | 70 |
| | Time (min) | 20 |
| | $HNO_3$ Concentration (%) | 50 |
| Silanization | Temperature (Celsius) | 25 |
| | Time (min) | 3 |
| | Silane Concentration (%) | 1 |
| Pd/Sn Solution Treatment | Temperature (Celsius) | 25 |
| | Time (min) | 5 |
| | HCl Concentration 37% (ml/L) | 200 |
| | Sn Concentration (g/L) | 1.73 |
| | Pd Concentration (mg/L) | 26 |
| Accelerator Addition | Temperature (Celsius) | 50 |
| | Time (min) | 5 |
| | Sulphuric acid 98% (vol %) | 4.5 |
| | Sodium Nitrate (%) | 40 |
| | Oxalic Acid Concentration (%) | 20 |
| Electroless Nickel Strike | Temperature (Celsius) | 25 |
| | Time (min) | 1.5 |
| | Nickel Concentration (wt %) | 1.5 |
| Electroless Nickel Plating | Temperature (Celsius) | 85 |
| | Time (min) | 15 |
| | Sodium Hyphophosphite (wt %) | 1.8 |
| | Malic acid (wt %) | 15 |
| | Nickel Concentration (g/L) | 5.5 |

Example 2: Effect of Surface Roughening

Sodium borosilicate glass surfaces where subjected to different treatments in order to determine the effect of surface roughening on the present process. The surfaces were treated with CMP, sandblasting, ammonium biflouride, or a combination of these and then plated as described in Example 1 above. Following ENP, the adhesion of the magnetic layer to the glass surfaces was tested using the Cross Cut Tape Test (ASTM D3359). The results are shown in Table 2 below.

TABLE 2

| CMP | Sandblasting Only | Ammonium Biflouride Only | Results |
| --- | --- | --- | --- |
| − | − | − | Magnetic layer peeled off before test |
| − | − | + | Magnetic layer peeled off before test |
| − | + | − | Passed |
| + | − | − | Passed |
| − | + | + | Passed |
| + | − | + | Magnetic layer peeled off before test |

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be formed by an apparatus controlled by hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable or machine readable medium having stored thereon computer executable instructions that when executed by a computer (e.g., a processor) control the computer to perform the functionality described herein. Examples of machine readable media suitable for implementing the subject matter described herein include non-transitory computer-readable media, such as disk memory devices, chip memory devices, programmable logic devices, and application specific integrated circuits. In addition, a machine readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

Certain components (including layers, coatings, or other components) listed herein may be described as "comprising," "made of," "including," or similar such terms, a material or a combination of materials. In one aspect, each of those components may also consist of that material or the combination of materials. In another aspect, each of those components may also consist essentially of that material or the combination of materials.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

If used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method for plating a layer of a nickel alloy onto a substrate comprising a glass surface, as part of forming a magnetic recording media, comprising the following steps in order:
   (a) providing the substrate comprising the glass surface;
   (b) subjecting the glass surface of the substrate to mechanical roughening in order to create a roughened surface comprising a mean square roughness of between 0.1 nm and 1 nm;
   (c) contacting the roughened surface of the substrate produced in step (b) with an oxidizing agent at a temperature of 50° C. to 100° C. for at least 15 minutes, thereby providing an oxidized surface having covalently bonded hydroxyl groups;
   (d) contacting the oxidized surface produced in step (c) with a solution comprising a silane compound, wherein the silane compound in the solution reacts with the covalently bonded hydroxyl group of the oxidized surface and is bonded to the glass surface by silanol bonds, thereby providing a silanized glass surface;
   (e) contacting the silanized glass surface produced in step (d) with a solution comprising a mixture of palladium ions and tin ions ("Pd/Sn solution"), wherein palladium from the Pd/Sn solution is deposited on the silanized glass surface, thereby forming an activated surface;
   (f) contacting the activated surface produced in step (e) with an accelerator solution comprising sodium nitrate and oxalic acid;
   (g) contacting the substrate surface produced by step (f) with a nickel ion-containing solution having a pH from 8 to 10, and a temperature of between 20° C. and 30° C. for a period of time sufficient to form a seed layer of nickel on the substrate surface produced by step (f) in order to perform an electroless nickel strike step; and
   (h) contacting the seed layer produced by step (g) with a nickel ion-containing solution having a pH from 4 to 6, and a temperature of between 40° C. and 80° C., for a period of time sufficient to produce the layer of nickel alloy comprising a final thickness from about 2 micrometers to 5 micrometers.

2. The method of claim 1, wherein the substrate is formed from a glass material and the glass surface is the surface of the substrate.

3. The method of claim 2, wherein the glass material is a silicate glass, a soda lime glass, an alkali-free glass, an aluminosilicate glass, a borosilicate glass, or an aluminoborosilicate glass.

4. The method of claim 2, wherein the glass material is amorphous glass.

5. The method of claim 2, wherein the glass material is partially crystallized.

6. The method of claim 1, wherein the step of subjecting the glass surface of the substrate to mechanical roughening comprises applying an abrasive material to the surface.

7. The method of claim 6, wherein the abrasive material is a slurry of microparticles having diameters of between 4 μm and 10 μm.

8. The method of claim 1, wherein the step of subjecting the glass surface of the substrate to mechanical roughening further comprises contacting the substrate surface with a corrosive chemical.

9. The method of claim 1, further comprising before step (c) the step of removing contaminants from the glass surface of the substrate.

10. The method of claim 1, wherein the oxidizing agent is selected from the group consisting of solutions of $H_2SO_4$, $H_2O_2$, $HNO_3$, chromic acid, $KMnO_4$, and combinations of two or more of the foregoing.

11. The method of claim 1, wherein the silane compound is selected from the group consisting of aminosilane, 3-(2-aminoethylamino)propyltrimethoxysilane (EDAS),
- 3-2-(2-aminoethylamino)ethylaminopropyltrimethoxysilane (ETAS), and
- (3-aminopropyl)triethoxysilane (APTES).

12. The method of claim 1, wherein the solution comprising a silane compound has a pH of between 10 and 12.

13. The method of claim 1, wherein the palladium and tin in the Pd/Sn solution are provided as $PdCl_2$ and $SnCl_2$.

14. The method of claim 1, wherein the Sn concentration in the Pd/Sn solution is between 2.0 g/L and 8.0 g/L.

15. The method of claim 1, wherein the Pd/Sn solution is contacted with the silanized glass surface at a temperature of between 20° C. and 40° C.

16. The method of claim 1, wherein the nickel ion-containing solution of step (h) comprises sodium hypophosphite.

17. The method of claim 1, further comprising depositing one or more additional materials onto the substrate to form a magnetic recording layer.

* * * * *

UNITED STATES PATENT AND TRADEMARK OFFICE
CERTIFICATE OF CORRECTION

| | | |
|---|---|---|
| PATENT NO. | : 11,192,822 B2 | Page 1 of 1 |
| APPLICATION NO. | : 16/676344 | |
| DATED | : December 7, 2021 | |
| INVENTOR(S) | : Mohd Aizat Abdul Wadi et al. | |

It is certified that error appears in the above-identified patent and that said Letters Patent is hereby corrected as shown below:

On the Title Page

Item (72) Inventors should read:
Inventor 1: Mohd Aizat Abdul Wadi, Johor Bahru (MY)
Inventor 2: Ming Shian Liew, Kuching (MY)
Inventor 3: Lih Shan Lim, Kuching (MY)

Signed and Sealed this
Thirty-first Day of December, 2024

Derrick Brent
*Acting Director of the United States Patent and Trademark Office*